United States Patent [19]

Eglinton et al.

[11] 4,116,327
[45] Sep. 26, 1978

[54] TRANSFER MECHANISM EMPLOYING BODILY EXTENSIBLE SLING STRUCTURE

[75] Inventors: Robert B. Eglinton, Hawthorne; James S. Tuell, Manhattan Beach, both of Calif.

[73] Assignee: Chromalloy American Corporation, New York, N.Y.

[21] Appl. No.: 752,411

[22] Filed: Dec. 20, 1976

[51] Int. Cl.² .......................................... B65G 11/10
[52] U.S. Cl. ................................ 198/560; 14/71.7; 214/91 R; 214/130 C; 214/DIG. 4
[58] Field of Search ............ 214/1 QC, 1 P, DIG. 3, 214/DIG. 4, 91 R, 130 C, 77 R, 77 D, 80, 82; 198/525, 534, 535, 560; 193/25 A, 25 AC, 25 R; 14/71.7

[56] References Cited

U.S. PATENT DOCUMENTS

| 389,743 | 9/1888 | Durrin | 214/1 QC |
| 1,905,387 | 4/1933 | Kirkwood | 214/1 QC |
| 3,045,846 | 7/1962 | Clark | 214/82 X |
| 3,251,450 | 5/1966 | Ridder | 198/560 X |
| 3,667,621 | 6/1972 | Barlow | 214/77 X |

Primary Examiner—Robert G. Sheridan
Assistant Examiner—George F. Abraham
Attorney, Agent, or Firm—William W. Haefliger

[57] ABSTRACT

Load transfer apparatus comprises:
(a) load receiving sling means having opposite ends, and
(b) support means operatively connected with at least one end of the sling means and bodily movable to endwise elongate the sling into a ramp position for gravity transfer of a load off the sling means.

13 Claims, 6 Drawing Figures

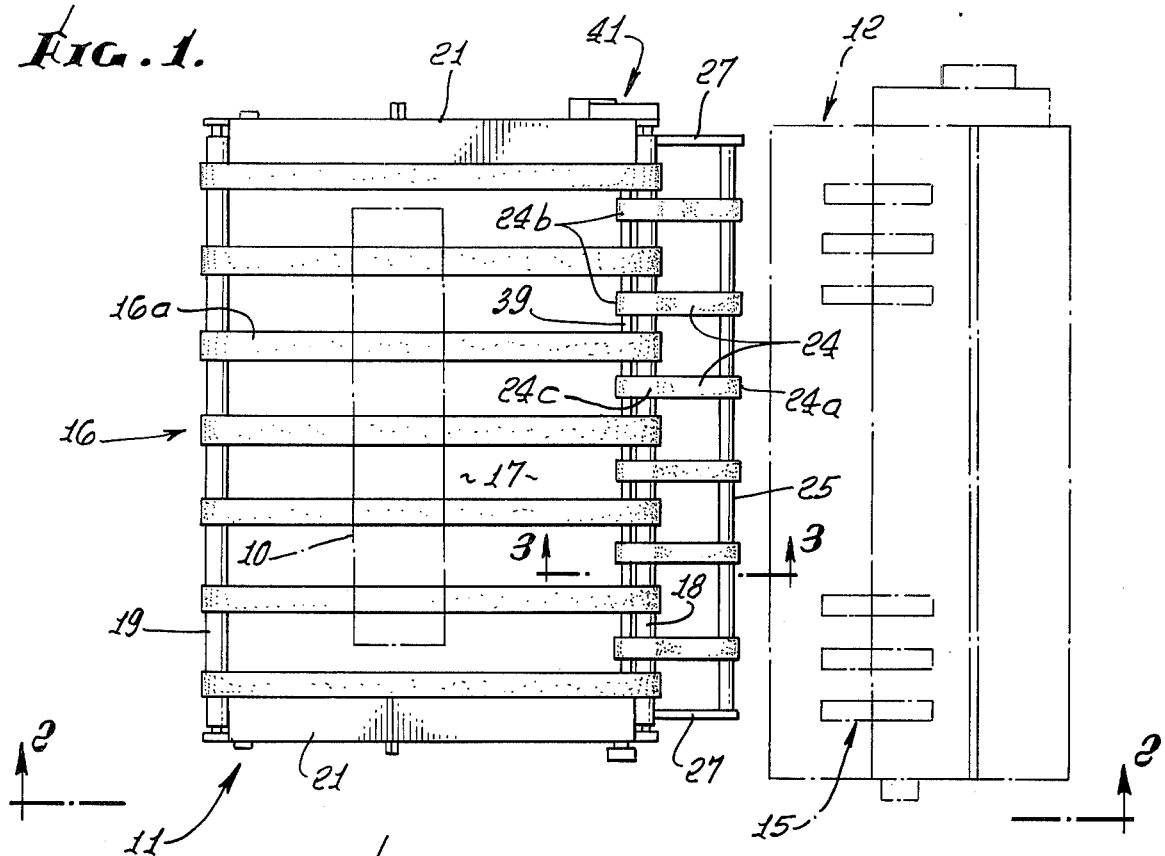
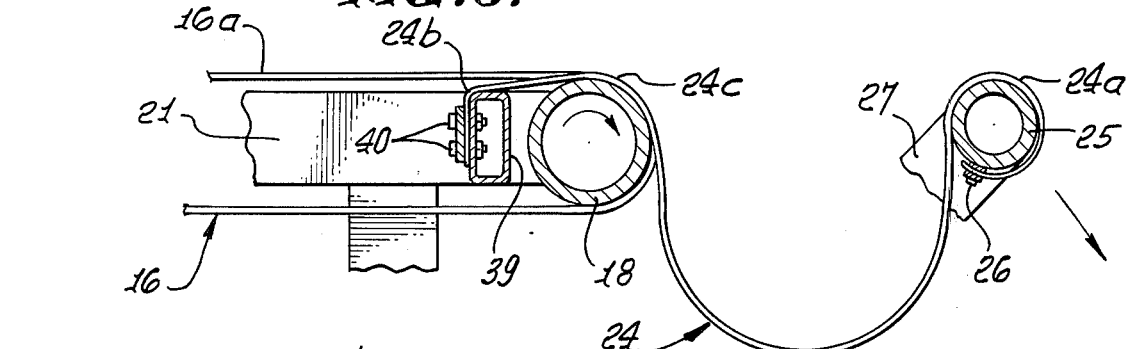
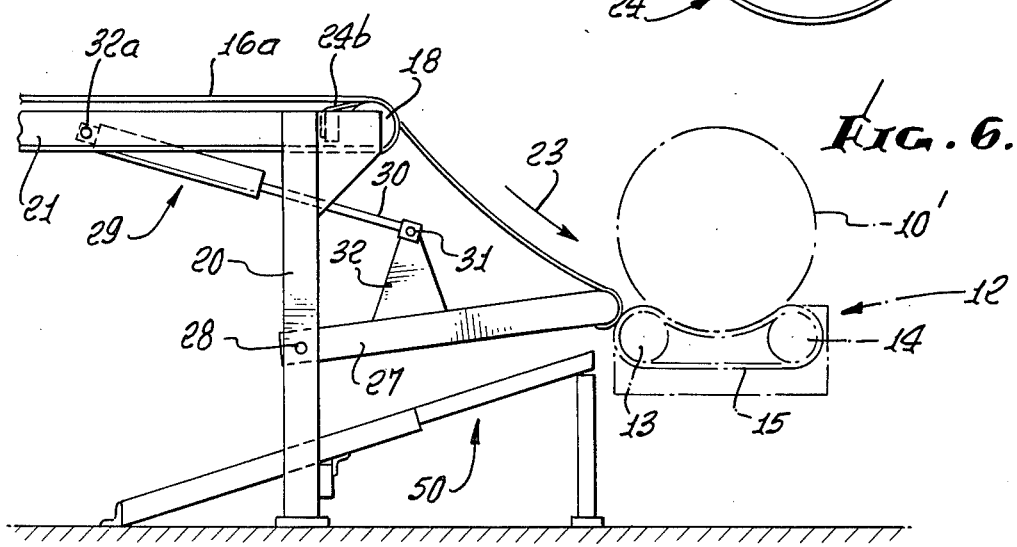

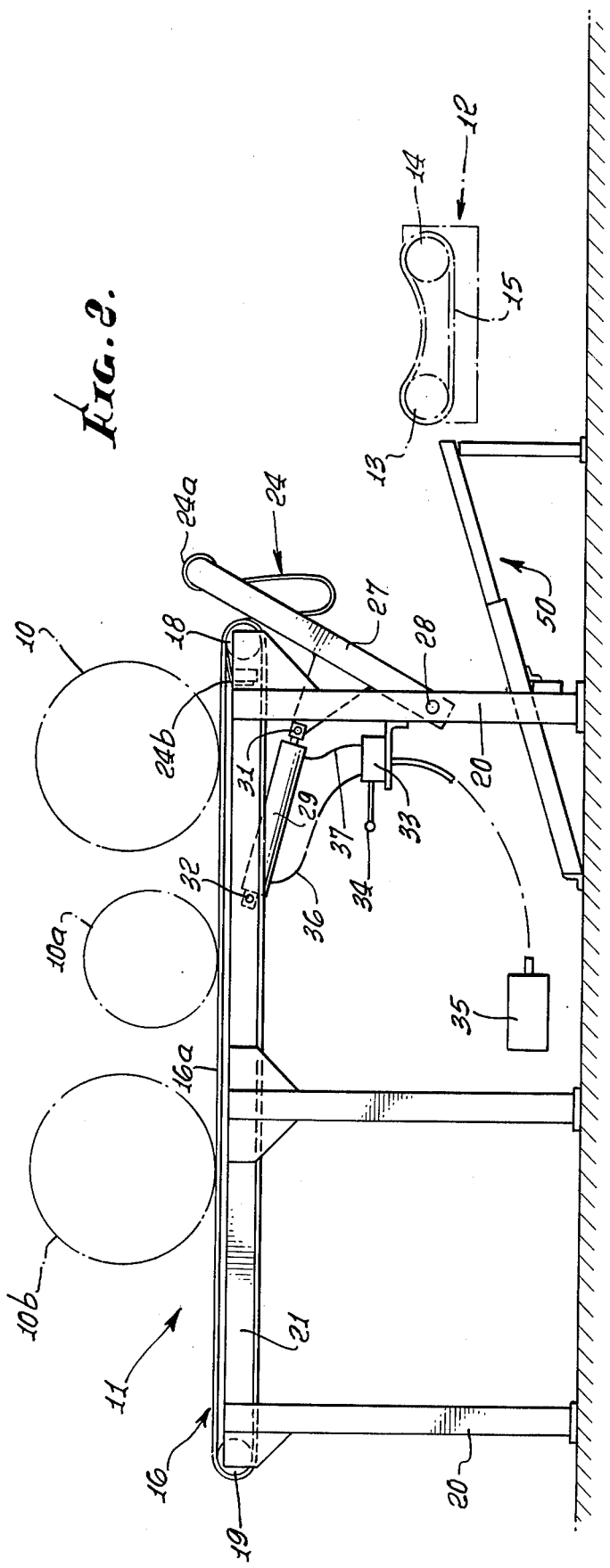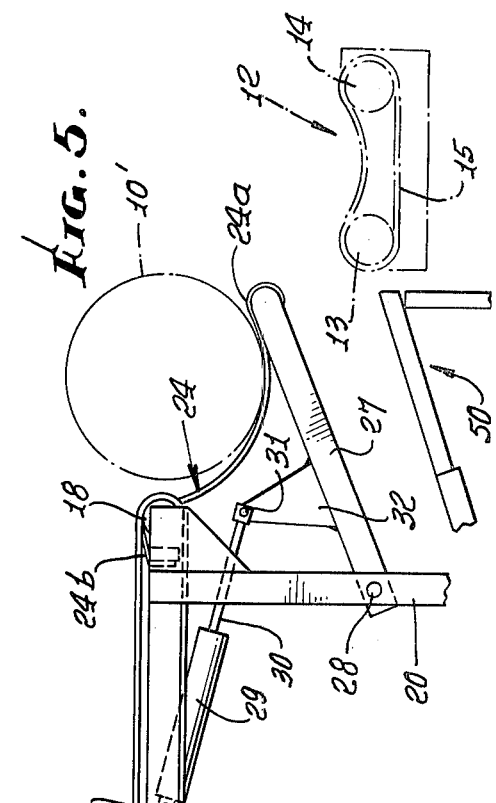

TRANSFER MECHANISM EMPLOYING BODILY EXTENSIBLE SLING STRUCTURE

BACKGROUND OF THE INVENTION

This invention relates generally to the transfer of heavy work rolls, as for example carpet rolls, and more particularly concerns the delivery of work rolls in sequence from an elevated storage location to a lower position.

In the past, the handling of heavy work rolls, such as carpet rolls, in warehouses and cutting rooms has been undesirably expensive in terms of involved labor cost. For example, workers might be required to operate motorized fork lifts to transfer heavy carpet rolls from a storage location to sizing and cutting equipment, one example of the latter being described in U.S. Pat. No. 3,931,940. No apparatus of which we are aware provides the unusual advantages in construction, mode of operation and results as are provided by the transfer apparatus of the present invention, which overcomes such prior problems and difficulties.

SUMMARY OF THE INVENTION

It is a major object of the present invention to provide transfer mechanism for pliable sheet work rolls, and characterized as reducing the time, labor and cost involved in handling such rolls, in the manner to be described. Basically, the apparatus includes:

(a) load receiving sling means having opposite ends, and (b) support means operatively connected with at least one end of the sling means and bodily movable to endwise elongate the sling means into a ramp position for gravity transfer of a load off the sling means.

As will be seen, the support means typically has a pivot axis about which the support means is swingable to bodily elongate the sling means from collapsed position, in which one end of the sling means is raised, to extended position in which that one end of the sling means is lowered. The sling means may advantageously include multiple belts, and the support means may include a transverse tubular member supporting the bodily movable ends of the belts, in variable wrap positions on the tubular member. An actuator or actuators may be provided to controllably bodily displace the support means as described.

Another object is to provide transfer mechanism to transfer work rolls in sequence to the sling means, the transfer mechanism typically including endless conveyors such as belts which are transversely spaced apart, and between the forward ends of which the fixed ends of the sling belts are located, for efficient transfer of the work roll off the transfer belts and onto the sling belts.

These and other objects and advantages of the invention, as well as the details of an illustrative embodiment, will be more fully understood from the following description and drawings, in which:

DRAWING DESCRIPTION

FIG. 1 is a plan view of apparatus incorporating the invention;

FIG. 2 is a side elevation taken on lines 2—2 of FIG. 1;

FIG. 3 is an enlarged fragmentary side elevation taken on lines 3—3 of FIG. 1;

FIG. 4 is a fragmentary side elevation showing the FIG. 2 apparatus in an intermediate position;

FIG. 5 is a view like FIG. 4, but showing a successive intermediate position; and FIG. 6 is a view like FIG. 5 but showing an ultimate position of the apparatus;

DETAILED DESCRIPTION

In FIGS. 1 and 2, a work roll 10, for example a carpet roll, as shown as supported by transfer mechanism generally indicated at 11. The latter functions to transfer the work roll longitudinally forwardly, i.e. to the right, with the roll extending laterally and horizontally. Additional work rolls appear at 10a and 10b in FIG. 2.

It is desired to controllably transfer the rolls, one at a time and as needed, off the mechanism 11 and onto a support at a lower elevation. For example, it may be desired to transfer carpet rolls into a carpet feeding carriage 12 operable to rotate the received roll in position, unwinding same to deliver carpet to cut-off and re-roll stations, as for example is described in U.S. Pat. No. 3,931,940. The carriage 12 may incorporate two parallel rollers 13 and 14 which extend laterally and horizontally, and around which laterally spaced belts 15 are trained, to support the carpet roll delivered thereto. Note that the carriage 12 is located forwardly of mechanism 11, and at a lower elevation.

The transfer mechanism 11 includes multiple conveyors such a belts 16 which extend forwardly in parallel relation, and which are laterally spaced apart. Their top stretches 16a are slidably supported on a horizontal table 17 so as to transport the roll 10 horizontally rightwardly. The belts are trained about two laterally horizontally extending rollers 18 and 19, these being in turn supported for rotation by a frame that includes uprights 20 and horizontal beam members 21. Table 17 may be carried by member 21.

In accordance with an important aspect of the invention, a load receiving sling means is provided to have opposite ends, typically longitudinally spaced apart; further, support means is operatively connected with at least one end of the sling means and is bodily movable for endwise elongating the sling means from a work roll receiving position to a ramp position for gravity transfer of the work roll (or load) off the sling means. For example, FIG. 3 shows a representative sling means in work roll receiving position, and FIG. 6 shows the sling means elongated into ramp position to transfer the work roll gravitationally downwardly and rightwardly into the carriage 12, as indicated by work roll received position 10' and arrow 23. As shown in the drawings, the sling means may advantageously include a series of like belts 24 which are laterally horizontally spaced apart, the belts extending generally forwardly.

The support means may advantageously include a elongated member, as for example tubular member 25, supporting one end (i.e. the bodily movable forward end portion 24a) of each belt 24. For example and as seen in FIG. 3, the forward end portion 24a is partly wrapped about the member 25 and attached thereto as by a fastener 26. The support means may also include arms 27 carrying the member 25 at its laterally opposite ends, the arms themselves being pivotally connected at 28 to uprights 20, so as to swing about a lateral axis defined by such pivots. Such pivoting serves to extend the sling belts from collapsed position (as seen in FIG. 3) in which the forward end 24a of each belt is raised relative to the main body of the belt, to elongate or forwardly extended position in which the belt forward end 24a is lowered relative to (and below the level of)

the main body of each belt. Note the tubular member 25 extends horizontally laterally throughout the range of bodily movement of the belts.

At least one actuator is connected to the sling support means to swing it in opposite directions about the axis defined by pivots 28, thereby to displace the sling belts between collapsed and extended positions. Such an actuator is indicated in FIGS. 2 and 4–6 as including a pneumatic cylinder 29 containing a piston and link 30 extending from the piston to a pivotal connection 31 attached at 32 to arm 27. The opposite end of the cylinder may be pivotally anchored at 32a to beam 21. A control valve is shown at 33 in FIG. 2 as manually actuable by handle 34 to control pressurized air delivery from source 35 to cylinder 29. Pressure lines 36 and 37 extend from the valve to either end of the cylinder to enable controllable displacement of the support means and sling belts to any position between the collapsed and extended position referred to. A cylinder 29 may be associated with each of the support arms 27.

Rearwardly located end portions 24b of the belts may advantageously be located intermediate the forwardmost ends of the conveyor belt stretches 16a, as for example is seen in FIG. 1. Such end portion 24b may be fixedly anchored as by anchor means remote from the bodily movable ends 24a of the belts. One such anchor means takes the form of a transverse anchor member 39 carried by the frame beams 21. The belt fixed ends may be attached to member 39 by fasteners 40.

A motorized drive for the roll 18 is shown at 41. Accordingly, the belts 24 rest on the roller 18 in slip engagement therewith, the roller rotating clockwise in FIG. 3.

In operation, a carpet roll transported to the right by belts 16a rides over the rollers 18 and the sling belt extents 24c resting on roller 18, to drop partially into the collapsed sling as seen in FIG. 4; thereafter, when the carpet roll is to be delivered to apparatus 12, the actuator is operated to pivot tubular member 25 clockwise as seen in FIGS. 4, 5 and 6, resulting in lowering of the carpet roll in the sling belts and gravity discharge onto the device 12 in FIG. 6.

An inclined guide 50 is located generally beneath the sling belts to receive a carpet roll discharge rearwardly off the device 12, in the manner as described for example in U.S. Pat. No. 3,931,940.

Work rolls, other than carpet, which can be handled by the invention include linoleum, paper, cardboard, rug cushioning materials, foam rubber, urethane foam, felt padding, textiles, canvas, roofing felt, burlap, plastic, leather, cork, etc; however, the invention has especially advantageous application to carpet.

We claim:
1. In load transfer apparatus
    (a) load receiving sling means having opposite ends,
    (b) support means operatively connected with at least one bodily movable end of the sling means and bodily movable to endwise elongate the sling means into a ramp position for gravity transfer of a load off the sling means,
    (c) anchor means for a fixed end of the sling means remote from said bodily movable end of the sling means, and relative to which said one end of the sling means is bodily movable between up and down positions, said support means in said down position being further from the anchor means than in said up position, and
    (d) movable transfer mechanism extending into proximity to the sling means fixed end to transfer a load over said fixed end of the sling means and onto the sling means in said up position of said one end of the sling means, said transfer mechanism comprising conveyor belts extending forwardly, the sling means including multiple belts having portions secured to said anchor means in load receiving proximity to the forwardmost ends of the conveyor belts.

2. The apparatus of claim 1 wherein said support means has a pivot axis about which the support means is swingable to bodily endwise elongate the sling means.

3. The apparatus of claim 2 including an actuator connected to said support means to swing it in opposite directions about said axis thereby to displace the sling means between collapsed and elongated positions.

4. The apparatus of claim 1 wherein the sling belts extend generally parallel downwardly in said elongated position of the sling means, the support means including a member supporting the bodily movable ends of the sling belts.

5. The apparatus of claim 4, wherein the sling belts are horizontally spaced apart, and said member extends horizontally throughout the range of bodily movement of said bodily movable ends of the sling belts.

6. In load transfer apparatus
    (a) load receiving sling means having opposite ends,
    (b) support means operatively connected with at least one bodily movable end of the sling means and bodily movable to endwise elongate the sling means into a ramp position for gravity transfer of a load off the sling means,
    (c) the sling means including a series of belts which extend generally parallel downwardly and transversely, in said elongated position of the sling means, the support means including a member supporting the bodily movable ends of the belts,
    (d) there being transfer mechanism located to transfer a work roll onto the sling means in collapsed position thereof said transfer mechanism including multiple conveyors which are horizontally spaced apart, said conveyors comprising belts extending forwardly, the sling means including multiple belts having portions located intermediate the forwardmost ends of the conveyor belts.

7. The apparatus of claim 6 wherein the transfer mechanism includes a rotary support roller about which the transfer belts are trained, said sling belt portions resting on the support roller in slip engagement therewith.

8. The apparatus of claim 7 wherein the transfer mechanism includes a motorized drive for the conveyor belts.

9. The apparatus of claim 7 including an anchor means for said fixed ends of the sling belts remote from said bodily movable ends of the sling belts.

10. The apparatus of claim 1 including a load on the transfer mechanism, the load comprising a carpet roll.

11. The apparatus of claim 10 including a carpet feeder device positioned to receive the carpet roll ejected off the sling means in ramp position thereof.

12. In load transfer apparatus,
    (a) load receiving sling means having opposite ends,
    (b) support means operatively connected with at least one bodily movable end of the sling means and bodily movable to endwise elongate the sling means into a ramp position for gravity transfer of a load off the sling means,
(c) the transfer mechanism located to transfer a work roll onto the sling means in collapsed position thereof,
(d) said work roll comprising a carpet roll located on the transfer mechanism,
(e) there being a carpet feeder device positioned to receive the carpet roll ejected off the sling means in ramp position thereof, and there being an inclined guide located generally beneath the sling means to receive a carpet roll displaced off the carpet feeder device.

13. The apparatus of claim 3 wherein the actuator is a fluid pressure responsive actuator, and including fluid pressure supply means incorporating a control valve connected with the actuator to effect controllable extension thereof thereby to control the positioning of the sling support means.

* * * * *